United States Patent
Saiki (10) Patent No.: US 11,286,017 B2
(45) Date of Patent: Mar. 29, 2022

(54) ADJUSTABLE BRAKE LEVER SENSOR SYSTEM

(71) Applicant: Neal Saiki, Santa Cruz, CA (US)

(72) Inventor: Neal Saiki, Santa Cruz, CA (US)

(73) Assignee: MSNS, LLC, Morgan Hill, CA (US)

( * ) Notice: Subject to any disclaimer, the term of this patent is extended or adjusted under 35 U.S.C. 154(b) by 30 days.

(21) Appl. No.: 16/596,761

(22) Filed: Oct. 9, 2019

(65) Prior Publication Data
US 2020/0207440 A1 Jul. 2, 2020

Related U.S. Application Data

(60) Provisional application No. 62/785,263, filed on Dec. 27, 2018.

(51) Int. Cl.
*B62L 3/02* (2006.01)
*G01D 5/14* (2006.01)
*B60T 7/08* (2006.01)

(52) U.S. Cl.
CPC ............... *B62L 3/02* (2013.01); *B60T 7/085* (2013.01); *G01D 5/142* (2013.01)

(58) Field of Classification Search
CPC . B62L 3/02; B60T 7/085; B60T 7/102; B62K 23/06; B62J 45/40; G01D 5/142
See application file for complete search history.

(56) References Cited

U.S. PATENT DOCUMENTS

| | | | | |
|---|---|---|---|---|
| 9,475,542 | B2* | 10/2016 | Marioni | B62L 3/02 |
| 2013/0228405 | A1* | 9/2013 | Tsai | B62K 23/06 |
| | | | | 188/344 |
| 2013/0228406 | A1* | 9/2013 | Tsai | B62L 3/02 |
| | | | | 188/344 |
| 2018/0304959 | A1* | 10/2018 | Liu | B62L 3/02 |

FOREIGN PATENT DOCUMENTS

| | | | | |
|---|---|---|---|---|
| DE | 29922485 U1 * | 5/2000 | | B60T 7/102 |
| EP | 2377753 A1 * | 10/2011 | | B60T 11/18 |

* cited by examiner

*Primary Examiner* — Thomas C Diaz
(74) *Attorney, Agent, or Firm* — Michael A. Guth (57) ABSTRACT

An adjustable hand brake lever assembly for a proportional electric braking system for a bicycle or other vehicle. The brake lever assembly may include a sensor assembly which is adapted for use with a standard brake lever assembly as used with mechanical cable braking systems. The sensor assembly may be replaced as a unit. The sensor assembly is adapted to allow for setting the reach adjustment, allowing a user to set a preferred initial position. The adjustable brake lever assembly may be coupled to a control electronic module and a regenerative braking system on a bicycle.

15 Claims, 6 Drawing Sheets

ADJUSTABLE BRAKE LEVER SENSOR SYSTEM

CROSS-REFERENCE TO RELATED APPLICATIONS

This application claims priority to U.S. Provisional Patent Application No. 62/785,263 to Saiki, filed Dec. 27, 2019, which is hereby incorporated by reference in its entirety.

BACKGROUND

Field of the Invention

The present invention relates to electric transport, and more specifically to a hand brake lever with sensor. Examples of such electric transport include electric bicycles, scooters, and tricycles.

Description of Related Art

Motivated by the environmental, public health, ecological, and carbon-footprint issues associated with gasoline-powered automobiles, researchers, governments, and society as a whole have been engaged in a search for viable alternatives. Electric bicycles (e-bikes), which are propelled by a combination of pedaling and battery-powered electric motors, are a promising alternative to automobile transportation. Their primary advantages include lower purchase and operating costs compared to cars, ability to travel longer distances and with less physical effort compared to traditional bicycles, and zero emissions during operation.

Regenerative braking is a unique technique that is used in EVs to capture energy that the vehicle has due to its motion or, in other words, its kinetic energy that would have been wasted when the vehicle decelerates while braking. By taking a measure of the initial and final vehicle velocity, the amount of kinetic energy which is lost to braking can be calculated.

Urban drive cycles have a considerable amount of acceleration and decelerating periods due to traffic control systems in place around towns and cities, and therefore, when decelerating, significant energy is lost. However, with regenerative braking, this energy can be captured, and 'waste' energy can be harnessed and utilized for vehicle propulsion. Similarly, off road cycles also have a considerable need for acceleration and deceleration due to climbing and descending hills.

A proportional electric braking system is adapted to provide varying amounts of braking force, where more braking is applied as the user further pulls on a brake lever. This simulates earlier, typical, bicycle braking systems in which as the user further deflects the brake lever increased tension is put into a brake cable. As the tension in the brake cable increases, this increased tension results in increased pressure from the brake pads onto the bicycle rim, or increased pressure of the brake pads onto a brake disc, in the case of a disc brake system.

In these prior mechanical cable brake systems, the brake cable is typically routed through an exterior cable sheath. A user may desire to set the brake lever to a preferred initial position, in that the braking of the bicycle may start when the lever if further from the handlebar, or closer to the handlebar. This may be referred to as reach adjustment. In a typical prior mechanical brake system, this is done by making an adjustment at the brake lever assembly by adjusting the end point of the cable sheath relative to the cable. This is typically done using a threaded sheath end stop device which can be screwed in, or screwed out, and then held in that chosen location with a lock nut.

With a proportional electric braking system there is not a sheathed mechanical cable setup, but instead there may be a sensor which reads deflection of the lever. As the deflection of the lever increases, the sensor signal may vary in such a way the level of braking also increases. This proportional sensor system may have electric conductors routed from it to an electronic control system for proportional electric braking system.

The proportional electric braking system and the sensor coupled to the lever do not operate as the mechanical cable braking system would, and do not offer a method of setting the brake lever to a preferred initial position, as there is no mechanical cable and cable sheath. What is called for is a proportional electric braking system which allows for the setting of a preferred lever position. What is also called for is an electronic sensor assembly for a proportional electric braking system which can be used in existing lever assemblies which are now used for mechanical braking systems.

SUMMARY OF THE INVENTION

An adjustable hand brake lever assembly for a proportional electric braking system for a bicycle or other vehicle. The brake lever assembly may include a sensor assembly which is adapted for use with a standard brake lever assembly as used with mechanical cable braking systems. The sensor assembly may be replaced as a unit. The sensor assembly is adapted to allow for setting the reach adjustment, allowing a user to set a preferred brake lever initial position without changing the signal from the senor assembly. The adjustable brake lever assembly may be coupled to a control electronic module and a regenerative braking system on a bicycle.

DETAILED DESCRIPTION

Figure 1:
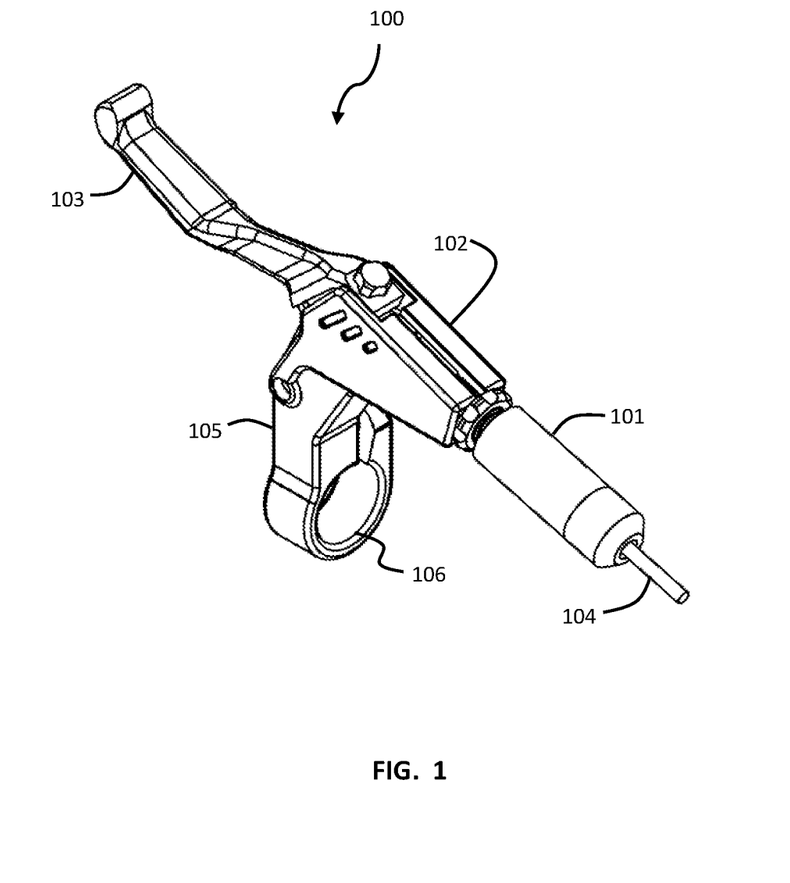
FIG. 1 is a view of a brake lever system for a proportional electric braking system according to some embodiments of the present invention.

In some embodiments of the present invention, as seen in FIG. 1, an adjustable handlebar mounted brake lever system 100 for a proportional electric braking system may have a brake lever assembly 102 coupled to a brake lever sensor assembly 101. The brake lever assembly may include a lever 103 adapted coupled to a main body 105 which includes a handlebar opening 106. A wire assembly 104 may extend from the sensor assembly 101. In some aspects, the brake lever assembly may be a standard brake lever assembly as used with mechanical cable braking systems. In some aspects, the main body 105 is mounted onto a bicycle handlebar, with a portion of the handlebar extending through the handlebar opening 106. In some aspects, the handlebar mounted brake lever system may be used on scooters, motorcycles, or other similar vehicles.

Figure 2A:
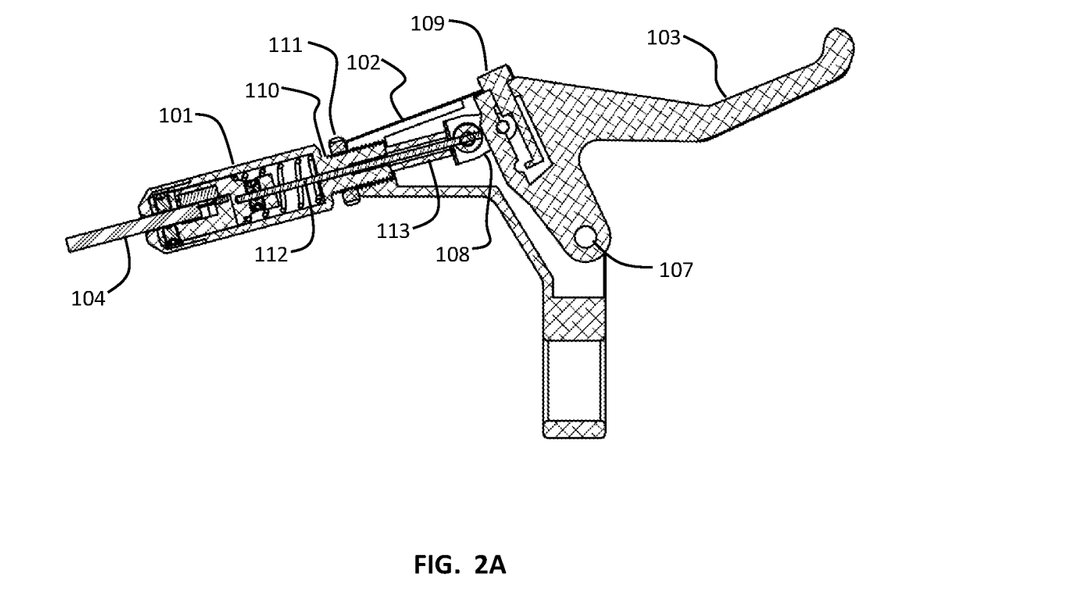
FIG. 2A is a cross-sectional view of a brake lever system for a proportional electric braking system according to some embodiments of the present invention.

FIG. 2A illustrates a cross-sectional view of an adjustable handlebar mounted brake lever system 100 for a proportional electric braking system according to some embodiments of the present invention. The lever 103 pivots around the pivot 107 allowing for rotational movement of the lever. The brake lever assembly 102 includes a coupler 108 which is affixed to the lever 103 with a keeper 109. In some aspects, the coupler may be integral to the lever, and may be a slot or hole adapted to receive a plug on the end of the plunger cable. Rotation of the lever 103 about the pivot 107 results in pulling of a joining member, which may be a plunger cable 112. The plunger cable 112 may have a cable sheath 122 which may prevent compressive deflection of the plunger cable 112. In some aspects, the joining member is a rigid member and includes pivoting interface joints at the sensor body interface and at the lever interface.

In some aspects, the main body and the lever of the handlebar mounted brake lever system are from a standard commercially available cable brake system. The cable may be removed from the lever coupling, and the barrel adjuster used to tighten the cable relative to its cable sheath is also removed from the body of the handlebar mount. The sensor assembly is then threaded into the interface in the handlebar mount body and a joining member couples the sensor assembly to the lever. The initial position of the lever may be adjusted by threading the sensor assembly further into, or further out of, the threaded interface of the body of the handlebar mount.

The sensor assembly 101 is adapted to relay information to an electronics portion with regard to the position of the brake lever 103. When a user pulls of the lever 103, the resulting rotation of the lever 103 pulls on the plunger cable 112 and compresses a spring, which can then return the lever to its original position when the lever is released. The sensor assembly 101 may have a threaded barrel 110 which allows for different positional placements of the sensor assembly 101 relative to the brake lever assembly 102. A user desiring to brake would pull on the lever, which will pivot around the pivot, and pull on the joining member. The pull on the joining member will be sensed by the sensor. In some aspects, the pull on the joining member will move a portion of the sensor relative to a fixed portion, resulting in an electric signal output that may be read by a control electronics which then commands braking in a regenerative braking system. The increasing movement of the lever around the pivot will cause more motion of the movable sensor portion, which will alter the signal output of the sensor, and result in an increase in the braking force commanded by the control electronics.

Figure 2B:
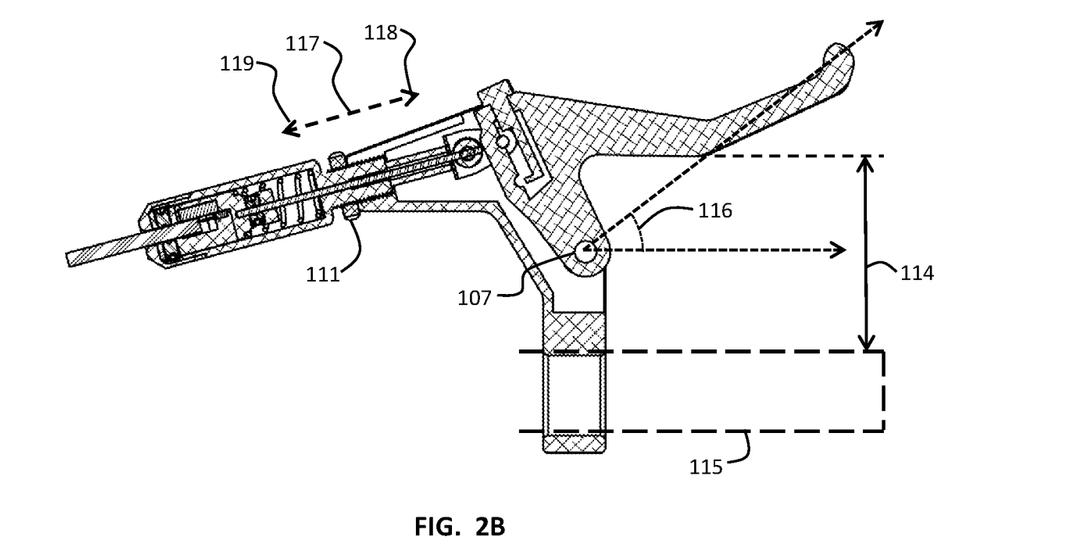
FIG. 2B is a cross-sectional view of a brake lever system for a proportional electric braking system according to some embodiments of the present invention.

As seen in FIG. 2B, the sensor assembly 101 may move along a direction parallel to an adjustment direction axis 117. Rotation of the housing 124 of the sensor assembly 101 will move the threaded barrel 110 linearly into a mating feature in the handlebar mount body 105. The sensor assembly 101 may move farther 119 from the handlebar mount body 105 or closer 118 to the handlebar mount body, depending on the direction of rotation of the sensor assembly 101. The lock nut 111 may be tightened against the handlebar mount body 105 in order to retain the sensor assembly in a desired position.

Altering the position of the sensor assembly 101 along a direction parallel to the axis 117 allows for a user to select a preferred initial position of the lever 103. For example, a rider with very large hands may be comfortable with a large distance 114 between the handlebar 115 and the lever as an initial position of the lever. In such a circumstance, the user may rotate the sensor assembly 101 such that the sensor assembly travels further out 119 along the adjustment direction 117. This will result in a larger angle 116 of the lever relative to the handlebar, and a larger distance 114 between the handlebar 115 and the lever 103. In similar fashion, the distance 114 between the lever 103 and the handlebar 115 may be shortened. There may be a variety of reasons why a user may select a particular initial position, which may be referred to as reach adjustment. As there is not a continuous mechanical cable between the lever and a mechanically operated brake unit in this electric braking system, the use of a contained sensor module 101 which has a cable 112 coupled to the coupler 108 allows for reach adjustment of the brake lever system for a brake lever assembly that has a single pivot 107.

Figure 3:
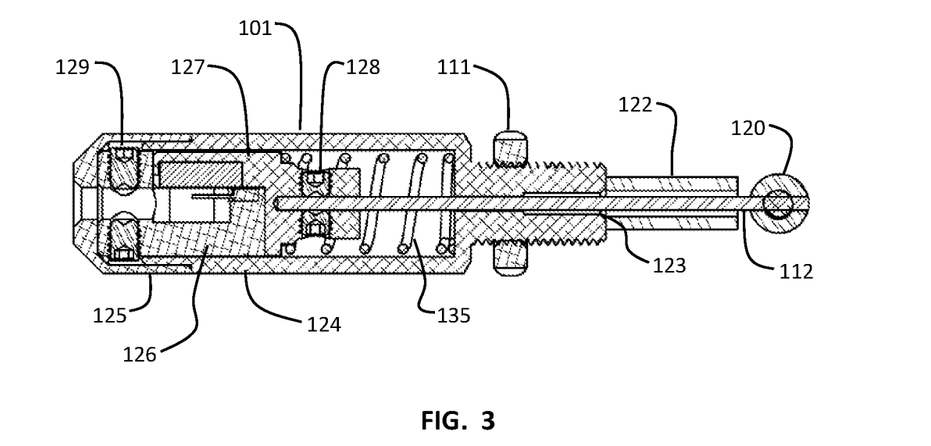
FIG. 3 is a cross-sectional view of a brake lever sensor assembly for a proportional electric braking system according to some embodiments of the present invention.

FIG. 3 illustrates a cross-sectional view of a brake sensor assembly 101 according to some embodiments of the present invention. In this example, the plunger cable 112 has not been extended, indicative of the circumstance where the brakes are not being activated. A cable stop 120 is affixed at or near the end of the plunger cable 112. A cable sleeve 122 is used to provide rigidity to the cable 112, in order to prevent excessive deflection of the cable. A widened passage portion 123 may be used to facilitate re-entry of an extended plunger cable 112 back into the internal passage through the threaded barrel 110. The second end of the plunger cable 112 is coupled to a plunger 127, and may be affixed to the plunger 127 using set screws 128. In some aspects, other fastening methods may couple the plunger cable 112 to the plunger 127. The plunger may contain a first side of a sensor system adapted to sense motion of the plunger 127 relative to a sensor holder 126. In some aspects, the sensor holder 126 contains a ratiometric hall sensor 136 and the plunger contains a magnet 131. The plunger 127 and the sensor holder 126 are adapted to slide relative to each other along a direction parallel to the adjustment direction axis 117. The plunger 127 will move relative to the sensor holder 126 in response to the user pulling on the brake lever, for example. Similarly, the plunger 127 will move relative to the sensor holder 126 as the spring 135 returns the plunger to an outboard position when the user is no longer pulling on the brake lever.

Both the sensor holder 126 and the plunger 127 have a portion that contains a cross section that is an arc with a flat which can also be referred to as a "D" shaped cross section. The purpose of this "D" cross section is to allow overlap between the sensor holder 126 and the plunger 127 in the areas that contain the ratiometric hall sensor 136 and magnet 131. The arc portion of the exterior surfaces of the plunger and the sensor holder may be substantially concentric to the inside surface of the interior surface of the main sensor assembly housing. In some aspects, the interior surface of the main sensor assembly housing is a cylindrical surface. The flats of the sections are oriented roughly parallel to each with a small or with no gap. The flat sections may be substantially flat is some aspects. In some aspects, the flat sections may include tongue in groove mating portions, or other profiles, which allow for sliding of the sensor holder and the plunger coaxial with or parallel to the adjustment direction axis 117. In this way, they are kept from rotating relative to each other. The arc shape of the sections allows them to fit inside the cylindrical interior cavity while allowing rotation of the main sensor assembly housing 124 around both pieces 126, 127 as the threaded barrel 110 is rotated into the mating receiving interface on the handle body. Although illustrated here as a "D" shaped cross-section, other mating cross-sections could be used which allow for the rotation of the main sensor assembly housing 124 around the internal sensor components, for example while the sensor assembly 101 is threaded into the handlebar mount main body 105. In some aspects, the plunger and sensor housing may have different configurations, wherein the plunger and sensor housing form a sub-assembly wherein at least the plunger is adapted to rotate relative to the interior of the main sensor assembly housing 124, and wherein the plunger may move along a sensor motion axis relative to the sensor housing.

The sensor holder 126 and the plunger 127 are not rotationally constrained relative to the main sensor assembly housing 124, allowing the main sensor housing assembly housing 124 to be rotated around its axis without the simultaneous rotation of the sensor holder 126 and the plunger 127. Although the plunger 127 is adapted to move along the adjustment direction axis 117 (or along an axis parallel to the adjustment direction axis 117), the sensor holder 126 is axially constrained within the main sensor assembly housing.

A spring 135 retains the plunger 127 at the far end of the internal barrel of the main sensor housing 124. The spring 135 also provides force against deflection of the lever, which will increase as the lever is further rotated, giving the user a feel as the braking force is increased similarly to that of mechanical braking system. Set screws 129 may be used to affix the electric wires (not shown in this view) which relay the sensor output to the electric brake control electronics. The set screws 129 may also fasten the sensor holder 126 in position at the far end of the internal barrel of the main sensor assembly housing 124. A sensor housing cap 125 may be coupled to the main sensor housing 124 to provide an enclosed housing.

Figure 4:
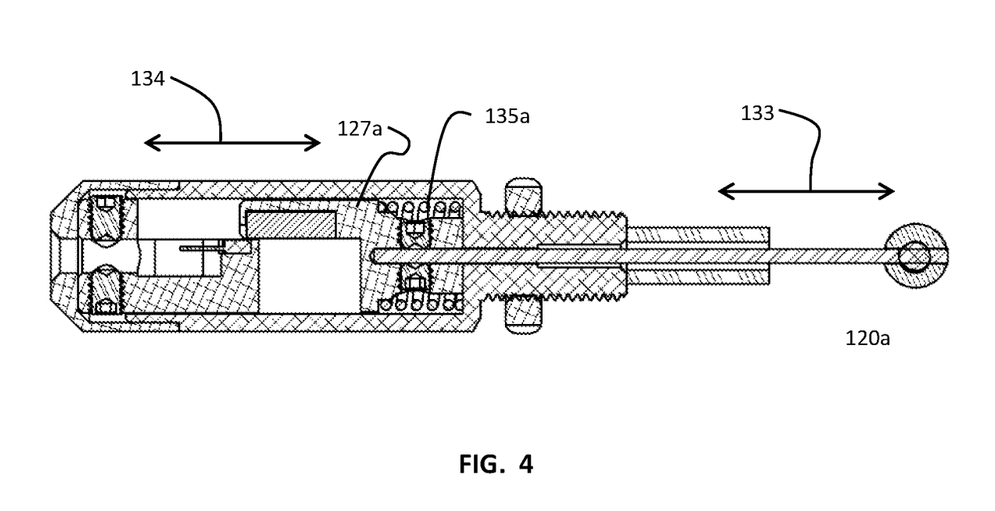
FIG. 4 is a cross-sectional view of a brake lever sensor assembly for a proportional electric braking system in an extended position according to some embodiments of the present invention.

FIG. 4 illustrates a cross-sectional view of a brake sensor assembly 101 in an extended position according to some embodiments of the present invention. As the cable stop 120 is pulled outward along an extension axis 133 to an extended position, cable stop moves to an extended position 120a. As the cable stop is coupled to the plunger with the plunger cable, the movement of the cable stop to the extended position 120a pulls the plunger 127 along a plunger path axis 134 to an extended position 127a. As the plunger moves to the extended position 127a, the spring is compressed into a compressed configuration 135a. Although shown only in two positions, it should be understood that plunger may travel through a variety of partially extended positions which will result in a higher level of braking as the cable 112 extends.

The differential motion of the portion of the internal sensor assembly coupled to the cable relative to the position of the sensor housing results in sensor signals indicating the level of braking desired. With a proportional braking system, as the brake lever is actuated, resulting in cable extension and relative motion of the internal sensor portions, the braking force increases.

Figure 5:
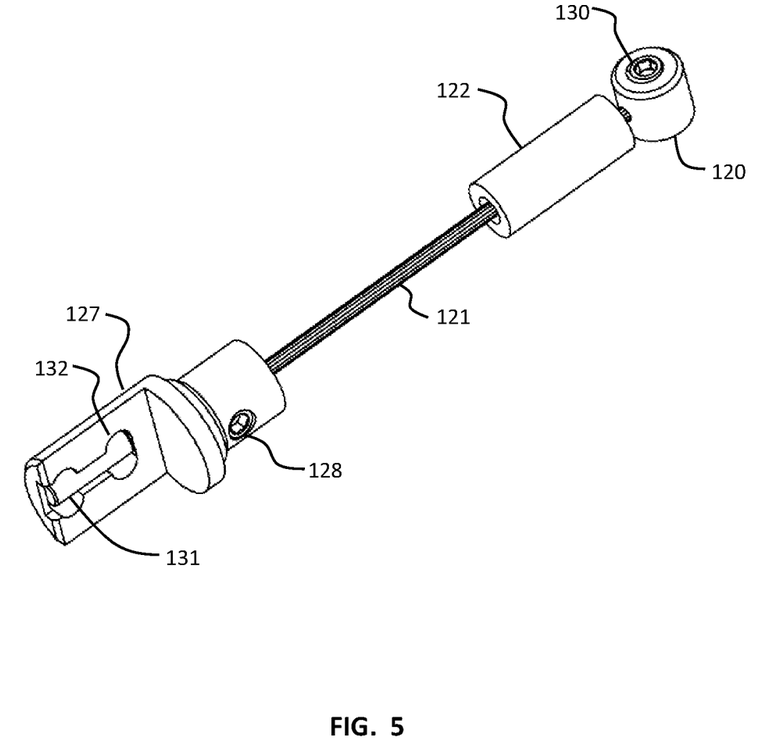
FIG. 5 is a view of a plunger assembly for a proportional electric braking system according to some embodiments of the present invention.

FIG. 5 illustrates a plunger and cable subassembly according to some embodiments of the present invention. The plunger 127 may have recesses 132 adapted to receive a magnet 131. A plunger cable 112 may couple the plunger 127 to the cable stop 120. The plunger cable 112 may be coupled to the cable stop 120 with a set screw 130. The plunger cable 112 may be coupled to the plunger with a set screw 128. Although illustrated here with a magnet adapted for use with a ratiometric hall sensor, other sensor types adapted to sense linear position may be used.

Figure 6:
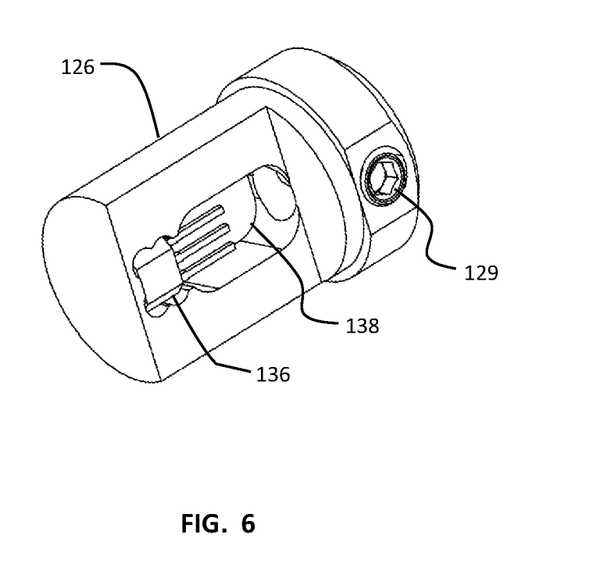
FIG. 6 is a view of a sensor holding assembly for a proportional electric braking system according to some embodiments of the present invention.
Figure 7:
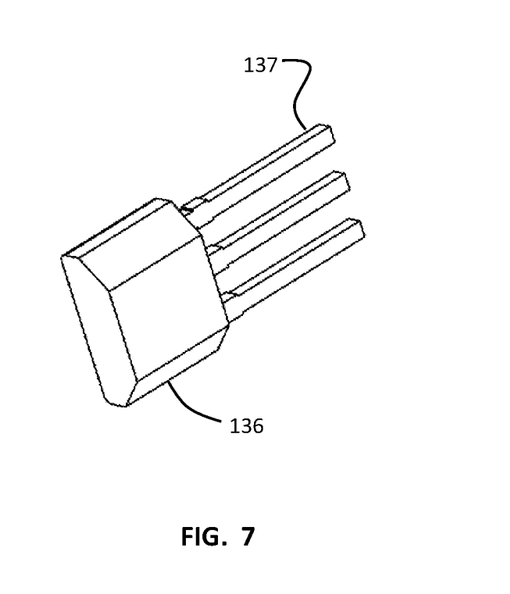
FIG. 7 is a view of a sensor.

FIGS. 6 and 7 illustrate aspects of the sensor assembly according to some embodiments of the present invention. The sensor holder 126 may include a recess 138 adapted to receive a sensor 136. Set screws 129 may couple the sensor holder to the sensor housing, and may also hold the sensor wires in position. A ratiometric Hall sensor 136 may include contact leads 137 which allow for linear positional information to be received by an electronics portion.

Figure 8:
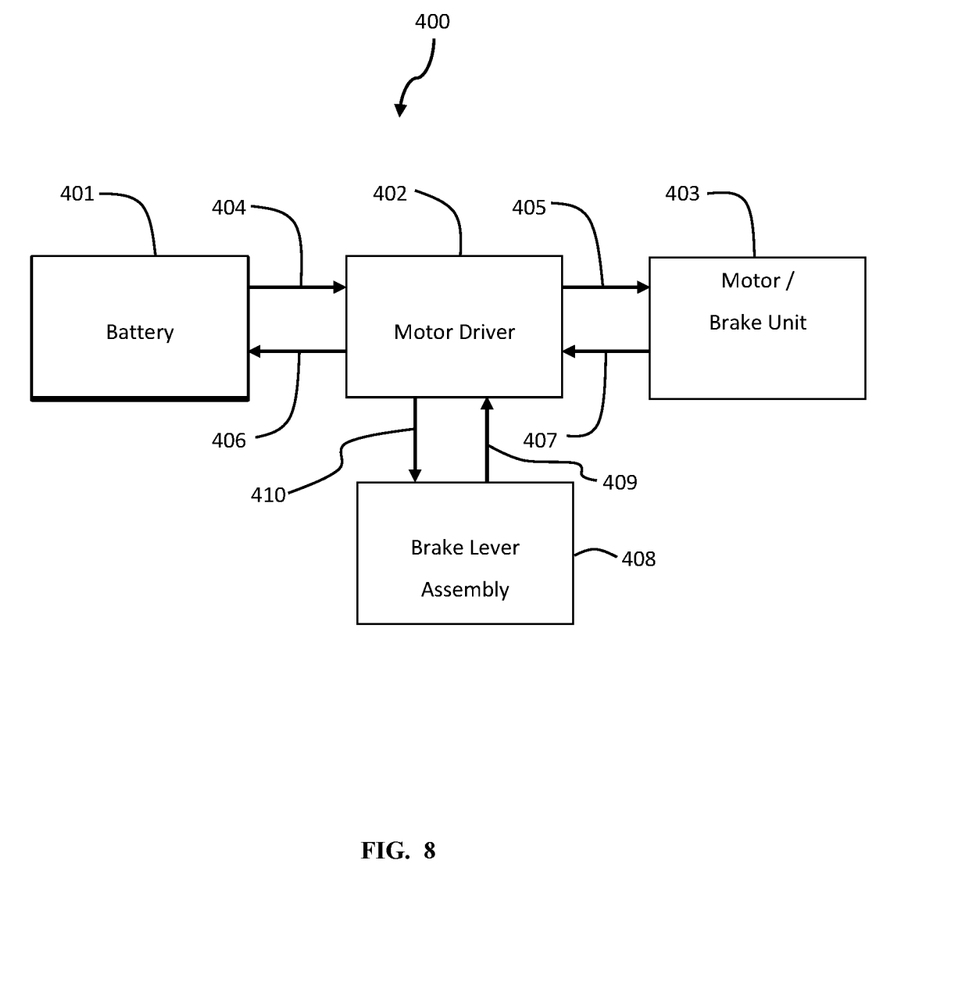
FIG. 8 is a block diagram of an electric braking system according to some embodiments of the present invention.

FIG. 8 illustrates an electric subsystem 400 which may be used in conjunction with electric bicycle systems according to some embodiments of the present invention. A battery 401 is coupled to a motor controller/driver 402, which in turn is coupled to a motor 403. In a drive scenario, the battery provides power 404 to the motor controller/driver, which then may modulate the power and provide it 405 to the motor 403. In a regenerative braking scenario, the motor may provide power 407 through the motor driver/controller 402 and on to 406 the battery 401. An adjustable brake lever assembly 408 according to embodiments of the present invention is coupled to the motor driver electronics and may provide a signal 409 from a brake lever sensor. The signal 409 may be adapted to allow for proportional regenerative braking at the brake unit 403. The motor driver electronics 402 may provide power 410 to the brake lever assembly 408.

In practice, an adjustable brake lever assembly for a proportional electric braking system allows a user to adjust the reach of the lever. In addition, a sensor assembly according to embodiments of the present invention allows for the use of existing brake lever assemblies with proportional electric braking systems, and to set an initial position or otherwise do reach adjustment with a lever assembly that does not have secondary reach adjustment.

Lever assemblies sometimes have reach adjustment in the form of a stop screw that can be turned in or out to change the initial lever position and thus provide reach adjustment. The present invention could be used in conjunction with such a reach adjustment stop screw. In this case, adjusting the reach of the lever may cause the sensor assembly to be in a less than ideal initial position. It may be necessary to adjust the position of the sensor assembly to compensate for the change in reach adjustment.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An adjustable brake lever assembly for a proportional electric braking system, said adjustable brake lever assembly comprising:

a lever, said lever comprising a coupler;

a handlebar mount body, wherein said lever is pivotally attached to said handlebar mount, said handlebar mount body comprising:
   a pivot point adapted for the pivoting of said lever; and
   a threaded mating feature for a sensor assembly threaded barrel;
a sensor assembly adjustably coupled to said handlebar mount body, said sensor assembly comprising a main sensor assembly housing and a threaded barrel, said threaded barrel of said sensor assembly adjustably coupled to said threaded mating feature of said handle bar mount body; and
a joining member, said joining member coupled to said sensor assembly on a first end, said joining member coupled to said coupler of said lever on a second end, wherein the adjustment of said sensor assembly adjusts the position of said lever relative to said handlebar mount body.

2. The adjustable brake lever assembly of claim 1 wherein said sensor assembly comprises:
   aplunger within said main sensor assembly housing, said plunger coupled to said joining member, said plunger adapted to move within said main sensor assembly housing along a sensor motion axis; and
   a sensor holder coupled to said main sensor assembly housing.

3. The adjustable brake lever assembly of claim 2 wherein said main sensor assembly housing comprises a cylindrically shaped interior cavity with a center axis parallel to or co-axial with said sensor motion axis, and wherein said main sensor assembly housing can rotate around said plunger and said sensor holder that are within said interior cavity of said main sensor assembly housing.

4. The adjustable brake lever assembly of claim 3 wherein said plunger comprises:
   a first outer surface portion substantially concentric with said interior cavity of said main sensor assembly housing; and
   a flat surface adapted to allow relative sliding motion of said first internal portion to said second internal portion along said sensor motion axis;
and wherein and said sensor holder comprises:
   a first outer surface portion substantially concentric with said interior cavity of said main sensor assembly housing; and
   a flat surface adapted to allow relative sliding motion of said plunger to said sensor barrel along said sensor motion axis.

5. The adjustable brake lever assembly of claim 2 wherein rotating said sensor assembly relative so said handle bar mount body increases or decreases the distance between said main sensor assembly housing and said sensor interface of said handle bar mount body.

6. The adjustable brake lever assembly of claim 5 wherein said joining member is a flexible member.

7. The adjustable brake lever assembly of claim 6 further comprising a sleeve around said joining member between said interface of said sensor assembly and said coupler.

8. The adjustable brake lever of claim 5 wherein said joining member is a rigid member.

9. The adjustable brake lever of claim 5 further comprising a magnet and a ratiometric Hall sensor, wherein said magnet is coupled to one of said plunger or said sensor holder, and wherein said ratiometric Hall sensors is coupled to the other of said plunger or said sensor holder.

10. The adjustable brake lever of claim 2 further comprising a magnet and a ratiometric Hall sensor, wherein said magnet is coupled to one of said plunger or said sensor holder, and wherein said ratiometric Hall sensors is coupled to the other of said plunger or said sensor holder.

11. The adjustable brake lever assembly of claim 1 wherein rotating said sensor assembly relative so said handle bar mount body increases or decreases the distance between said main sensor assembly housing and said sensor interface of said handle bar mount body.

12. The adjustable brake lever assembly of claim 1 wherein said joining member is a flexible member.

13. The adjustable brake lever assembly of claim 12 further comprising a sleeve around said joining member between said interface of said sensor assembly and said coupler.

14. The adjustable brake lever of claim 1 wherein said joining member is a rigid member.

15. A method for retrofitting a standard bicycle brake lever for use with a proportional regenerative braking system, said method comprising the steps of:
   inserting a sensor assembly into a threaded barrel adjuster interface of the handlebar mount body of a bicycle brake lever assembly, said bicycle brake lever assembly comprising a handlebar mount body and a lever pivotally coupled to said handlebar mount body;
   coupling a first end of a joining member to the sensor assembly;
   coupling a second end of the joining member to the lever and
   adjusting the initial position of the lever by further inserting or backing out the sensor assembly into the threaded interface of the handlebar mount body.

* * * * *